No. 609,062. Patented Aug. 16, 1898.
G. S. WEBB.
CHAIN ADJUSTMENT FOR BICYCLES OR OTHER MACHINES.
(Application filed May 5, 1896. Renewed Dec. 20, 1897.)
(No Model.)
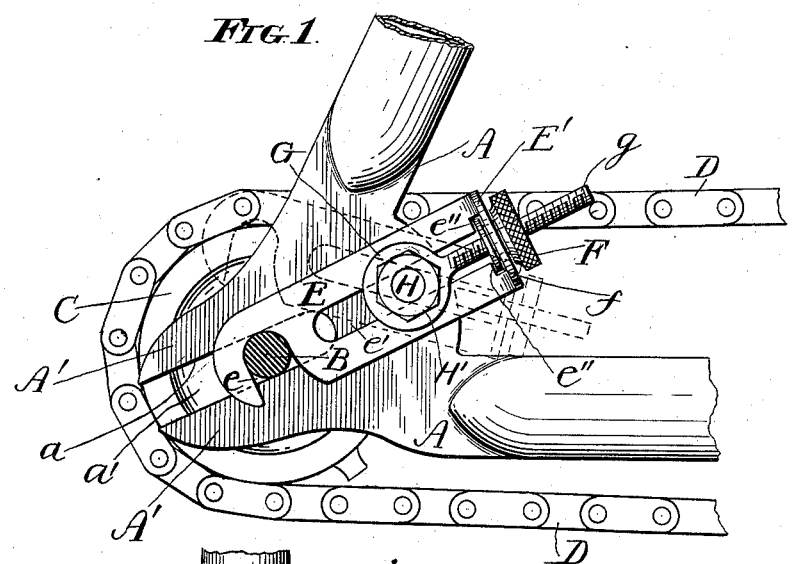
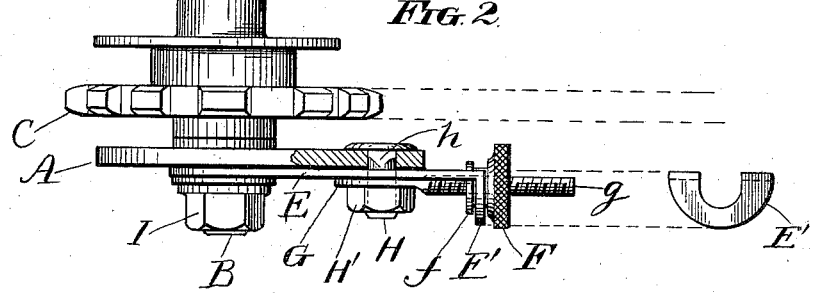
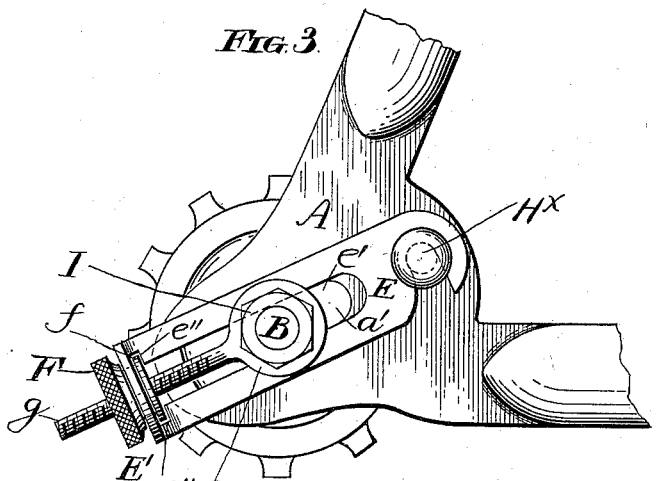
Witnesses:
J. Halpenny
J. Cross
Inventor:
George S. Webb
By his attorneys
Gridley & Hopkins

UNITED STATES PATENT OFFICE.

GEORGE S. WEBB, OF AURORA, ILLINOIS.

CHAIN ADJUSTMENT FOR BICYCLES OR OTHER MACHINES.

SPECIFICATION forming part of Letters Patent No. 609,062, dated August 16, 1898.

Application filed May 5, 1896. Renewed December 20, 1897. Serial No. 662,731. (No model.)

*To all whom it may concern:*

Be it known that I, GEORGE S. WEBB, a citizen of the United States, residing at Aurora, in the county of Kane and State of Illinois, have invented certain new and useful Improvements in Chain Adjustments for Bicycles or other Machines, of which the following is a specification.

The present invention relates to the mechanism for adjusting the axle of one sprocket-wheel in its relation to the axle of a second sprocket-wheel for the purpose of putting the drive-chain which embraces them under proper tension, said mechanism being also instrumental in holding the axle to its adjustment while tightening the check-nuts by which it is secured in the frame, this mechanism being technically known in the art as the "chain adjustment."

The invention relates more especially to that class of chain adjustments that enable the wheel to be removed from the frame and replaced and secured therein without disturbing the relations of those parts upon the positions of which the adjustment of the chain depends; and the object of the invention, stated broadly, is to provide an improved chain adjustment of this particular class.

To this end I provide the frame of the machine (whether it be a bicycle or other machine) with a seat for the axle, said seat being disposed in the general direction of the two laps of the drive-chain and being of sufficient length to permit such adjustment of the axle as may be necessary in order to put the drive-chain under proper tension, and I provide a gage which may be pivoted either to the frame or to the axle and which has a feature (hereinafter called a "gaging-seat") which is adapted to engage the axle if the gage is pivoted to the frame or to engage the frame (or a part associated therewith) if the gage is pivoted to the axle. The feature called a "gaging-seat" preferably takes the form of a hook, which results from cutting a notch in the edge of the sheet-metal plate of which the principal part of the gage is made; but I desire to have it understood that the invention is not limited in this respect. The principal object of this gaging-seat is to indicate the position that the axle should occupy upon its seat, and hence any pivoted gage so constructed that when in one position it will accomplish this result and when moved from that position will permit the unrestricted lateral movement of the axle upon its seat is within the scope of my invention regardless of the character of the gaging-seat or the part with which it directly coöperates.

The invention consists in the features of novelty that are particularly pointed out in the claims hereinafter, and in order that it may be fully understood I will describe it with reference to the accompanying drawings, which are made a part hereof, and in which—

Figures 1 and 2 are respectively a side elevation and a plan view of a chain adjustment embodying the invention in its preferred form, and of the adjacent parts of a bicycle on which it is used. Fig. 3 is a side elevation of a chain adjustment embodying some features of the invention and of the adjacent parts of a bicycle on which it is used, the principal difference between what is here shown and what is shown in Figs. 1 and 2 being found in the manner of using the parts which are herein collectively referred to as the "adjustable gage."

A represents a portion of a bicycle or similar frame comprising fragments of the rear ends of the rear fork-arms and a part through the medium of which they are rigidly united and provided at $a$ with a seat for the axle B.

C represents the sprocket-wheel, and D the drive-chain, all of which parts may be of any desired construction. I prefer, however, that the seat $a$ be formed on the lower edge of the upper one of two tongues A' that are the result of cutting in a sheet-metal plate, which is incorporated in and forms a part of the frame, a slot $a'$, whose sides are parallel, this being preferred for the reason that it gives a seat of sufficient length to permit the necessary lateral movement of the axle for the purpose of adjustment and for the further reason that the lower one of the two tongues aids in holding the axle in place.

E is the sheet-metal plate of which the principal part of the adjustable gage is made. It has a notch $e$ near one of its ends, which results in a hook, the inner surfaces of which in this the preferred form constitute the gage-seat herein referred to. Near its opposite extremity it is bent at right angles to form a flange E', and it is provided with a slot e', which extends from a point in the vicinity of the gaging-seat to and partly through the flange. The portion of the slot which is in the flange receives the reduced neck of a thumb-nut F, which fits a threaded stem g, projecting from a ring or washer G, the slot being widened at e'' for receiving the flange f of the nut. With this arrangement the nut is restrained against any movement excepting rotation, and when it is rotated it causes the stem to move endwise, and thereby cause the ring or washer to change its position with relation to the gaging-seat.

As shown in Figs. 1 and 2, the ring or washer fits upon a short stud or bolt H, which has a non-circular portion h, that fits an opening of corresponding shape, formed through the frame forward of the axle-seat, a nut H' being turned onto the bolt for clamping the gage to the frame with sufficient friction to hold it against any movement relatively thereto and to hold its several parts against any movement relatively to each other. When the nut H' is loosened, the gage may be moved to the position indicated by dotted lines. When the gage is in the position shown by full lines, the gaging-seat is in engagement with the axle B, and by reason of the particular character of the gaging-seat shown in the drawings so long as the gage remains in this position any lateral movement of the axle upon its seat is prevented. When, however, the gage is moved to the dotted position, the axle may be moved forward to the end of its seat or backward so far as the slack of the drive-chain will permit. If it is desired to remove the axle and the slack of the drive-chain is not sufficient to permit it, the drive-chain is run off of one or both of the sprocket-wheels, and in order to slack it sufficiently to permit this the axle may, if necessary, be moved to the forward extremity of its seat. It is in order to permit this forward movement of the axle upon its seat that the parts are so constructed and arranged as to enable the gage to be moved entirely beyond the axle-seat, as indicated by dotted lines. Having removed the axle, when it is desired to again replace it by bringing the gaging-seat of the gage into engagement with it it will be compelled to return to the exact position from which it was moved, and by making this gaging-seat in the form of a hook, as above described, it will perform the additional function of holding the axle temporarily in place while the check-nut I is being tightened.

When it is desired to change the position of the axle for the purpose of adjusting the tension of the chain, the check-nuts H and I are loosened and the thumb-nut F is rotated in the direction that will give the desired result, the effect of rotating this thumb-nut being to adjust the gaging-seat and the pivotal point of the gage with relation to each other. During the acts of removing and replacing the axle there will be nothing tending to rotate the thumb-nut, and consequently these acts may be performed without disturbing the adjustment of the parts upon whose relative positions the adjustment of the chain depends.

The gage shown in Fig. 3 does not differ in construction from the gage shown in Figs. 1 and 2, but the manner of using it differs somewhat. In Figs. 1 and 2 the gage is pivoted to the frame and its gaging-seat engages the axle, while in Fig. 3 it is pivoted to the axle and its gaging-seat engages a stud $H^x$, that is secured to the frame forward of the axle-seat. The principal features of this invention are, however, present in both of these arrangements—that is to say, in both there are two parts—namely, a frame and an axle—whose positions with relation to each other are to be gaged, and there is a gage pivoted to one of these parts and having a gaging-seat adapted to engage the other and thereby either indicate or determine the proper relative positions of the parts. In both the pivotal axis of the gage is parallel with the axle, so that the gage may be moved in a plane which is perpendicular to the axle to a position which will permit the axle to be removed from its seat without disturbing the adjustment of the gage itself. In both the gaging-seat and the pivot of the gage are adjustable with relation to each other, and in both the details in the construction of the gage are similar.

Having thus described my invention, the following is what I claim as new therein and desire to secure by Letters Patent:

1. In a bicycle or other vehicle, the combination of a sprocket-chain, a sprocket-wheel embraced by the chain, an axle upon which the sprocket-wheel is mounted, a frame having a seat disposed in the general direction of the two laps of the sprocket-chain upon which the axle is adjustable for the purpose of adjusting the tension of the chain, and a gage for determining the relative positions of the frame and axle, said gage being pivoted to one of the last-named parts, the pivotal axis of the gage being parallel with the axle so that the gage may be moved in a plane which is transverse to the axle to a position which will permit the axle to be moved forward upon its seat for the purpose of slacking the chain, substantially as set forth.

2. In a bicycle or other vehicle, the combination of a sprocket-chain, a sprocket-wheel embraced by the chain, an axle upon which the sprocket-wheel is mounted, a frame having a seat disposed in the general direction of the two laps of the sprocket-chain, upon which the axle is adjustable for the purpose of adjusting the tension of the chain and an adjustable gage for determining the relative positions of the frame and axle, said gage being pivoted to one of the last-named parts, and its pivotal axis being parallel with the axle so that the gage may be moved in a plane which is transverse to the axle to a position which will permit the axle to be removed from its seat without disturbing the adjustment of the gage, substantially as set forth.

3. In a bicycle or other vehicle, the combination of a sprocket-chain, a sprocket-wheel embraced by the chain, an axle upon which the sprocket-wheel is mounted, a frame having a seat disposed in the general direction of the two laps of the sprocket-chain, upon which the axle is adjustable for the purpose of adjusting the tension of the chain and an adjustable gage for determining the relative positions of the frame and axle, said gage being pivoted to the frame and having a gaging-seat adapted to engage the axle, the pivotal axis of the gage being parallel with the axle so that the gage may be moved in a plane which is transverse to the axle to a position which will permit the axle to be removed from its seat without disturbing the adjustment of the gage, substantially as set forth.

4. In an adjustment substantially as described, a gage having in combination a part provided with a gaging-seat, a ring or washer for receiving a pivot about which the gage may be moved, and means for adjustably securing said ring or washer to the part aforesaid, substantially as set forth.

5. In an adjustment substantially as described, a gage having in combination a part provided with a gaging-seat and having a slot for the passage of a pivot, a ring or washer adapted to receive said pivot and means for adjusting the position of the ring or washer with relation to the part aforesaid, substantially as set forth.

6. In an adjustment substantially as described, a gage having in combination a part provided with a gaging-seat consisting of a hook, a ring or washer adapted to receive a pivot, and means for adjusting the position of the ring or washer with relation to the part aforesaid, substantially as set forth.

GEORGE S. WEBB.

Witnesses:
L. M. HOPKINS,
I. CROSS.